United States Patent [19]

Rajakovics et al.

[11] B 4,014,752

[45] Mar. 29, 1977

[54] PROCESS AND ARRANGEMENT FOR VAPORIZING OF LIQUIDS

[75] Inventors: Gundolf Rajakovics, Vienna; Heinz Gabernig, Graz; Günter Peter Klein, Vienna, all of Austria

[73] Assignee: Vereinigte Edelstahlwerke AG, Vienna, Austria

[22] Filed: Jan. 30, 1973

[21] Appl. No.: 328,065

[44] Published under the second Trial Voluntary Protest Program on March 30, 1976 as document No. B 328,065.

[30] Foreign Application Priority Data

Feb. 2, 1972 Austria ................................ 842/72

[52] U.S. Cl. ............................ 202/185 A; 203/75; 203/82; 203/88; 203/90; 159/DIG. 17

[51] Int. Cl.[2] ...................... B01D 3/00; B01D 3/06

[58] Field of Search .................. 203/88, 90, 42, 75, 203/82, 100, 100 DC; 202/185 A, 173; 159/2, 3, DIG. 17, 20

[56] References Cited

UNITED STATES PATENTS

| | | | |
|---|---|---|---|
| 2,991,298 | 7/1961 | Raffaeta | 203/90 |
| 3,152,984 | 10/1964 | Winsche et al. | 159/DIG. 12 |
| 3,448,017 | 6/1969 | Chang et al. | 203/88 |
| 3,459,640 | 8/1969 | Tsunawki et al. | 203/88 |
| 3,475,329 | 10/1969 | Little et al. | 203/90 |
| 3,480,515 | 11/1969 | Goeldner | 203/90 |
| 3,707,442 | 12/1972 | Takahashi et al. | 202/173 |
| 3,734,835 | 5/1973 | Spicacci | 202/173 X |
| 3,763,016 | 10/1973 | Hair | 202/185 A |

*Primary Examiner*—Jack Sofer

[57] ABSTRACT

A process and installation for vaporizing liquids and in particular radioactive liquids. A two-step flash vaporization is carried out. The vapor exiting from a first vaporizing stage is condensed by means of liquid taken from a second vaporizing stage, the latter liquid being injected into a condenser into which the vapor steam from the first vaporizing stage is being conducted. The thus formed mixture is conducted into the second vaporizing stage.

4 Claims, 1 Drawing Figure

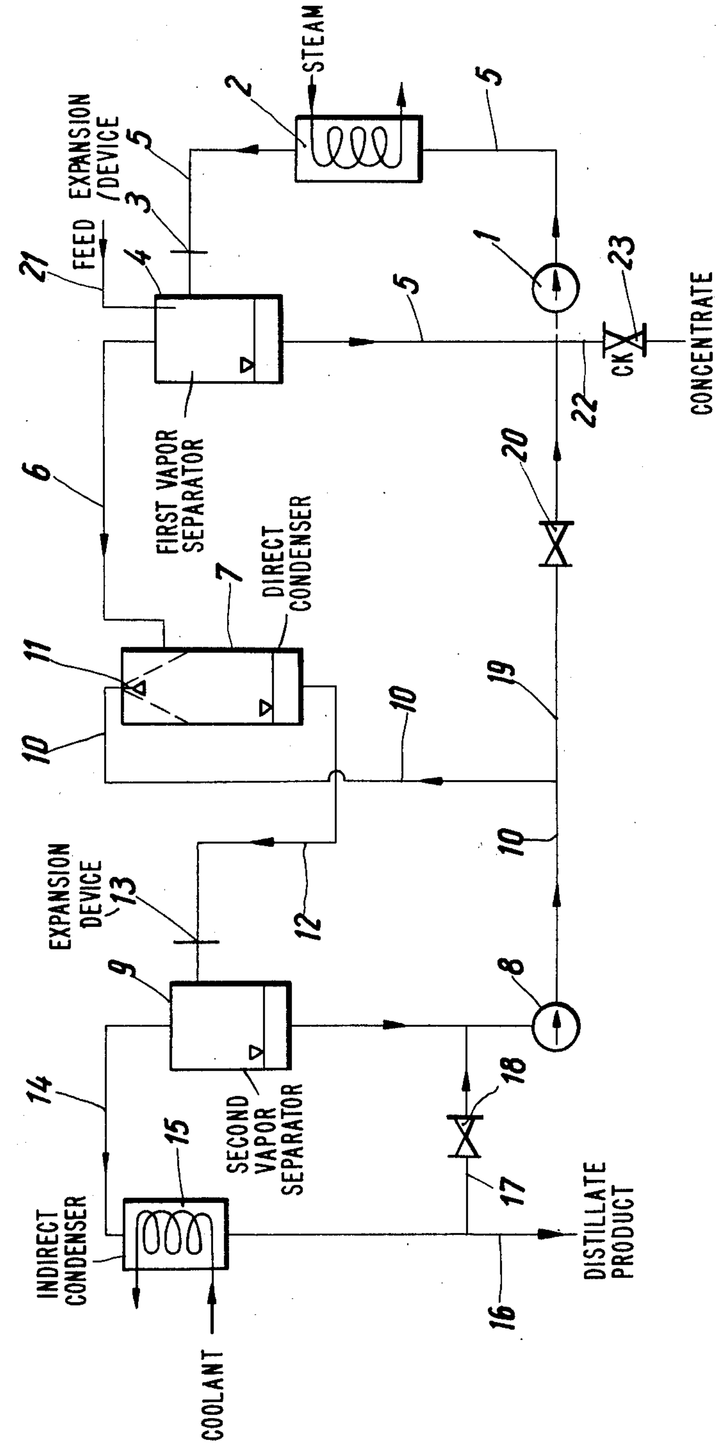
STEAM
EXPANSION
/DEVICE
FEED
FIRST VAPOR
SEPARATOR
DIRECT
CONDENSER
EXPANSION
DEVICE
SECOND
VAPOR
SEPARATOR
INDIRECT
CONDENSER
COOLANT
DISTILLATE
PRODUCT
CONCENTRATE
CK
1
2
3
4
5
6
7
8
9
10
11
12
13
14
15
16
17
18
19
20
21
22
23

PROCESS AND ARRANGEMENT FOR VAPORIZING OF LIQUIDS

BACKGROUND OF THE INVENTION

In the treatment of radioactive liquids waste it is advantageous to employ vaporizing techniques, since the radioactive contaminants of the liquid are in general non-volatile and can to a large measure be disposed of in the liquid concentrate remaining after such liquid is vaporized. Advantageously, the vapor resulting from the evaporation operation is then condensed for disposal by being contracted by an atomized liquid.

One general technique of this type is shown e.g. in U.S. Pat. No. 3,480,515, issued to R. W. Goeldner on Nov. 29, 1969.

Unfortunately, conventional evaporation techniques of this type are limited in effectiveness by the fact that radioactive droplets of small diameter from the incoming liquid to be purified are unavoidably carried along with the vapor from the evaporation stage, and serve to impose what has heretofore been an irreducible minimum concentration of radioactivity in the final product distillate.

The present invention has as its main object to provide a relatively simple process for vaporizing radioactive liquids and for avoiding the problem indicated above. This distillate obtained by the process has a substantially lower radioactivity than the distillates obtained by the vaporizing installations of the prior art. This result is achieved in the process of this invention by employing a two-step vaporization in which the vapor exiting from a first vaporization stage is condensed by means of liquid obtained by recirculation from a second vaporization stage and the thus formed mixture is conducted to the second vaporization stage. A portion of the liquid mixture resulting from the condensation of the vapor from the first vaporization stage is separately vaporized in the second vaporizing stage. The vapor from the second vaporizing stage is then condensed to form a highly radioactive-free product distillate.

Advantageously, a portion of the liquid mixture present in the second vaporizing stage after such last-mentioned evaporation is recirculated to the first vaporizing stage to further reduce the radioactivity of the final product.

BRIEF DESCRIPTION OF THE DRAWING

For a better understanding of the invention, reference is made to the sole FIGURE of the accompanying drawing in which there is illustrated a schematic flow diagram constituting a preferred embodiment of the invention.

DESCRIPTION OF THE PREFERRED EMBODIMENT

In a first vaporizing stage, comprising a heat exchanger 2, an expansion device 3, and a vapor separator 4 there is forceably recirculated by means of a circulation pump 1 via a conduit 5 a strongly radioactive liquid concentrate including radio-active substances from waste water issuing from a nuclear reactor (not shown). Such waste water, which is introduced via a feed line 21, is in closed circulation with the heat exchanger 2. The heat exchanger 2 is heated by means of steam. The expansion device 3 is a conventional one known in the art. The vapor which is formed as a result of such first expansion vaporization flows from the upper side of the vapor separator 4 via a conduit 6 into an injection condenser 7. Liquid from a second vapor separator 9 is being injected into this injection condenser 7 by means of a second circulation pump 8 via conduit 10 and an atomizing nozzle 11 into the injection container 7, wherein the atomizing nozzle 11 finely distributes the liquid. This causes a condensation of the vapor in the injection condenser 7. From the bottom side of the injection condenser 7 there thus flows the liquid via a conduit 12 to a second conventional expansion device 13 from whence it is conducted to the second vapor separator 9. The device 13 and vapor separator 9 constitute the second vaporizing stage. Together with the pump 8 and condenser 7 vapor flows from the upper side of the last mentioned vapor separator 9 via a conduit 14 into a surface condenser 15 and is condensed therein by means of cooling water. The product thus formed has negligible radioactivity and is conducted via a conduit 16 out of the installation. In order to avoid an increase in radioactivity during the vaporizing process in particular in the liquid circulating between the injection condenser 7 and the separator 9, a portion of such liquid is fed back from the pressure side of the second circulating pump 8 via a return conduit 19 having a throttle valve 20 or the like to the suction side of the first circulating pump 1. A corresponding amount of liquid resulting from condensation in the condenser is fed back from the exit side of the condenser 15 via a regulating valve 18 or the like and a compensating conduit 17 to the suction side of the second circulating pump 8. The highly radioactive concentrate from the first vapor separator can be removed by means of a conduit 5 and bush 22 provided with a check valve 23.

When vaporizing radioactive fluids, the above-noted vapor pressures amount to, for example 1.78 atmospheres in the first vapor separator 4 and 1.0 atmosphere in the second vapor separator 9.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. In a process for vaporizing a radioactive liquid by a two-step vaporization technique employing first and second flash vaporization stages, wherein liquid is introduced to the first vaporization stage to be circulated, heated and flash-evaporated and wherein vapor resulting from the flash evaporation of the liquid in the first vaporization stage is condensed in a first direct condenser, the improvement wherein the condensing step is accomplished by means of enriched liquid obtained from the second vaporization stage and applied via a circulation pump to the first condenser to form therein a mixture of the enriched liquid obtained from the second vaporization stage and the condensate of the vapor from the first vaporization stage, and wherein the process further comprises the steps of the flash-evaporating said mixture in the second vaporization stage, and recycling a portion of the liquid emerging from the pressure side of the circulating pump to the first vaporization stage.

2. A process as defined in claim 1, wherein the process further comprises the step of condensing, in a second indirect condenser, the vapor formed in said second vaporization stage, and feeding back a portion of the distillate obtained from said second condenser to the suction side of said circulating pump.

3. In an installation for vaporizing a radioactive liquid:

a first vaporizing stage comprising a flash device, circulating means, and means for heating liquids to be vaporized in the flash device;

first conduit means for feeding liquid to be vaporized to said first vaporizing stage;

a first direct condenser;

a second vaporizing stage comprising a flash device;

a circulating pump;

second conduit means for connecting the second vaporizing stage to the suction side of said circulating pump;

third conduit means for connecting said first condenser to the flash device of the second vaporizing stage;

fourth conduit means for connecting the pressure side of said circulating pump to said first condenser;

fifth conduit means for applying vapor formed in said first vaporizing stage to said first condenser;

a second indirect condenser;

sixth conduit means for applying vapor formed in said second vaporizing stage to said second condenser;

seventh return-flow conduit means for connecting the pressure side of said circulating pump to said first vaporizing stage, said seventh conduit means having a throttle device for regulating the flow therethrough;

means for discharging a portion of the concentrate produced in said first vaporizing stage; and means for discharging distillate produced in said second condenser.

4. An installation as defined in claim 3, further comprising eighth conduit means coupled to the distillate discharging means for applying a portion of the distillate produced in said second condenser to the suction side of said circulating pump, said eighth conduit means having a control valve for regulating the flow therethrough.

* * * * *

UNITED STATES PATENT OFFICE
CERTIFICATE OF CORRECTION

Patent No. 4,014,752 Dated March 29, 1977

Inventor(s) Gundolf Rajakovics et al.

It is certified that error appears in the above-identified patent and that said Letters Patent are hereby corrected as shown below:

On the cover sheet the assignee should read -- Vereinigte Edelstahlwerke Aktiengesellschaft (VEW), Vienna, Austria --.

Signed and Sealed this

*Eighteenth* Day of *April 1978*

[SEAL]

*Attest:*

RUTH C. MASON
*Attesting Officer*

LUTRELLE F. PARKER
*Acting Commissioner of Patents and Trademarks*